(12) United States Patent
Crisp

(10) Patent No.: US 9,479,440 B1
(45) Date of Patent: Oct. 25, 2016

(54) SPECIFYING AND ENFORCING IPV4 AND IPV6 CPE LIMITS

(75) Inventor: Russell Lee Crisp, Atlanta, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 833 days.

(21) Appl. No.: 13/397,386

(22) Filed: Feb. 15, 2012

(51) Int. Cl.
*H04L 12/813* (2013.01)
*G06F 15/177* (2006.01)

(52) U.S. Cl.
CPC ............. *H04L 47/20* (2013.01); *G06F 15/177* (2013.01)

(58) Field of Classification Search
None
See application file for complete search history.

(56) References Cited

U.S. PATENT DOCUMENTS

| 7,941,512 B2 * | 5/2011 | Droms | ................ H04L 12/2801 709/222 |
| 2005/0286430 A1 * | 12/2005 | Koga | .................... H04L 12/462 370/241 |

* cited by examiner

*Primary Examiner* — Robert C Scheibel
*Assistant Examiner* — Ayanah George
(74) *Attorney, Agent, or Firm* — Bart A. Perkins

(57) ABSTRACT

Systems and methods can provide for specifying and enforcing IPv4 and IPv6 CPE limits in a modem device. In some implementations, such systems and methods can inspect a packet originating from CPEs behind a modem to determine whether the packet is an IPv4 or IPv6 packet. Such systems and methods can compare the packet source MAC address to determine whether the address exists in the IPv4 and/or IPv6 CPE tables. The modem can then perform varying actions based on IPv4 or IPv6 CPE limit enforcement mechanisms, thereby alleviating the problem of a single CPE limit enforcement policy for all CPEs.

20 Claims, 5 Drawing Sheets

SPECIFYING AND ENFORCING IPV4 AND IPV6 CPE LIMITS

TECHNICAL FIELD

This disclosure relates to specifying and enforcing customer premise equipment (CPE) IP address limits in modem devices.

BACKGROUND

The Data-Over-Cable Service Interface Specification (DOCSIS) was established by cable television network operators to facilitate transporting data packets, primarily internet packets, over existing community antenna television (CATV) networks. In addition to transporting data packets, as well as television content signals over a CATV network, multiple services operators (MSO) also use their CATV network infrastructure for carrying voice, video on demand (VoD) and video conferencing packet signals, among other types.

Broadband services can be delivered via existing cable infrastructure from MSOs, digital subscriber lines (xDSL), integrated service digital network (ISDN), public switched phone networks, or T1 connections from telecommunications operators or internet service providers, satellite from satellite operators, or wireless services (such as, e.g., cellular, 802.11 or Wi-MAX standards) from wireless service providers, among many others. Typically, subscribers access multiple broadband communications devices at their location to provide such varied services, with each device assigned a unique Internet Protocol (IP) address.

The growth of network devices such as, for example, cable modems (CMs) and multimedia terminal adapters (MTAs) has expanded traditional data services to provide additional functionality such as, for example, voice over internet protocol (VoIP) telephony service in a single integrated device. Furthermore, additional embedded components are increasingly added to existing integrated devices, each requiring one or more IP address. As embedding additional components and customer premise equipment (CPE) devices requiring unique IP addresses becomes prevalent, the need to alleviate the problem of IP version 4 (IPv4) address scarcity becomes significant.

Typically, with an open dynamic host configuration protocol (DHCP), the need for enforcement of IPv4 limits becomes increasingly critical. To mitigate the problems of IPv4 scarcity, some standards such as DOCSIS have standardized CPE device limit that are present behind a user modem. Moreover, the increasing use of IP version 6 (IPv6) has greatly reduced the scarcity of IPv4 addresses. However, there is currently no solution for a service provider to enforce IPv4/IPv6 limits such as, for example, allowing a user to be granted a greater number of IPv6 addresses while simultaneously continuing to limit maximum IPv4 addresses.

DETAILED DESCRIPTION

In some implementations of this disclosure, systems and methods can operate to specify and enforce IPv4 and IPv6 CPE limits in a modem device. In some implementations, the modem device can enforce preconfigured limits for IPv4 and IPv6 CPE devices behind a modem device. In some implementations, data packets originating from a CPE device can be parsed and determined to be an IPv4 or IPv6 packet by examining the etherType field of the packet's Ethernet header. In some implementations, an etherType value of 0x0800 or 0x0806 would be IPv4; an etherType value of 0x86DD would be IPv6.

In some implementations, the modem device can inspect the etherType field and subsequently initiate either an IPv4 or IPv6 CPE table lookup based on the data packet's source media access control (MAC) address. If the CPE table lookup is unsuccessful, the packet can either be admitted or rejected by the modem device based on the specified CPE limit for that packet type. For example, if the source MAC address of an IPv4 packet is not found in the IPv4 CPE table, and if the IPv4 CPE limit has not been reached, the modem device can admit the IPv4 packet and add the corresponding source MAC address to the IPv4 CPE table. If the IPv4 CPE limit has been reached and the source MAC address matches an address in the IPv4 CPE table, then the modem device can admit the IPv4 packet. If the IPv4 CPE limit has been reached and the source MAC address does not match an address in the IPv4 CPE table, then the modem device can reject the IPv4 packet and can subsequently perform optional error logging functions. Correspondingly, a separate method can be performed for IPv6 packets with a different IPv6 CPE limit and a different IPv6 CPE table of source MAC addresses. In some implementations, the modem can allow all IPv6 packets to pass through to the network.

In some implementations, the modem device can use configurable IPv4 and IPv6 CPE limits specified via the modem's management information base (MIB). In other implementations, the modem can check for specified IPv4 and IPv6 CPE limits specified via the modem's configuration file TLVs. In still further implementations, if a limit is not defined, the modem device can default to no maximum CPE limit. It should be understood that flexibility in the enforcement policies and limits can be accomplished based on specific system configurations such as, for example, Dual-Stack CPE devices that send both IPv4 and IPv6 data packets from the same source MAC address.

Figure 1:
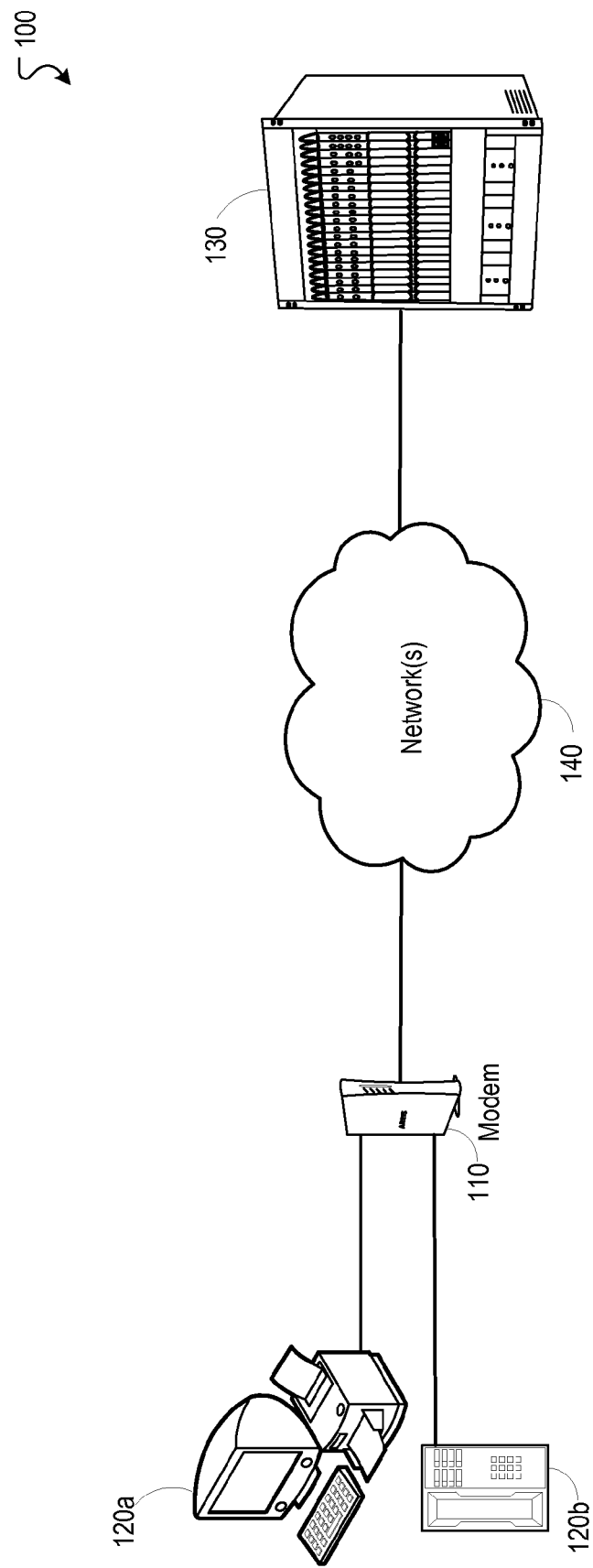
FIG. 1 is a block diagram illustrating an example network environment operable to specify and enforce IPv4 and IPv6 CPE limits.

FIG. 1 is a block diagram illustrating an example network environment operable to specify and enforce IPv4 and IPv6 CPE limits. In some implementations, a modem 110 can distribute video, data and/or voice service(s) to and receive data from user customer premise equipment (CPE) devices such as, for example, a CPE device 120a or an internet telephone 120b. The modem 110 can communicate with a headend device 130 over one or more network(s) 140. In the case of cable telephony, the network(s) 140 can be an HFC network.

The headend 130 can include devices such as a cable modem termination system (CMTS) and/or an edge quadrature amplitude modulation (EQAM) device, or a combined device including multiple edge and/or video or data devices. In various implementations, the network(s) 140 can include one or more networks internal to the headend 130 and/or one or more networks external to the headend 130 (e.g., one or more extranets, the Internet, etc.).

The modem device 110 can connect to devices such as, for example, a CPE device 120a or VoIP phone 120b. The modem device 110 can operate to specify and enforce IPv4 and IPv6 CPE limits from CPE devices (e.g., CPE device 120a or VoIP phone 120b). For example, if the CPE device 120a transmits a packet destined for the headend 130, the modem device 110 can inspect the etherType field of the packet's Ethernet header to determine the IP type. If the IP type is IPv4, the IPv4 CPE table is to be searched and the IPv4 CPE limit is to be enforced; if the IP type is IPv6, the IPv6 CPE table is to be searched and the IPv6 CPE limit is to be enforced. If the MAC address of the CPE device 120a is found in the appropriate CPE table, the packet is forwarded to the headend 130. If the MAC address of the CPE device 120a is not found in the appropriate CPE table, and the appropriate CPE limit is not reached, the MAC address of the CPE device 120a is added to the appropriate CPE table and the packet is forwarded to the headend 130. If the MAC address of the CPE device 120a is not found in the appropriate CPE table, and the appropriate CPE limit is reached, the packet is discarded by the modem device 110. Optional error logging functions can subsequently be performed.

Figure 2:
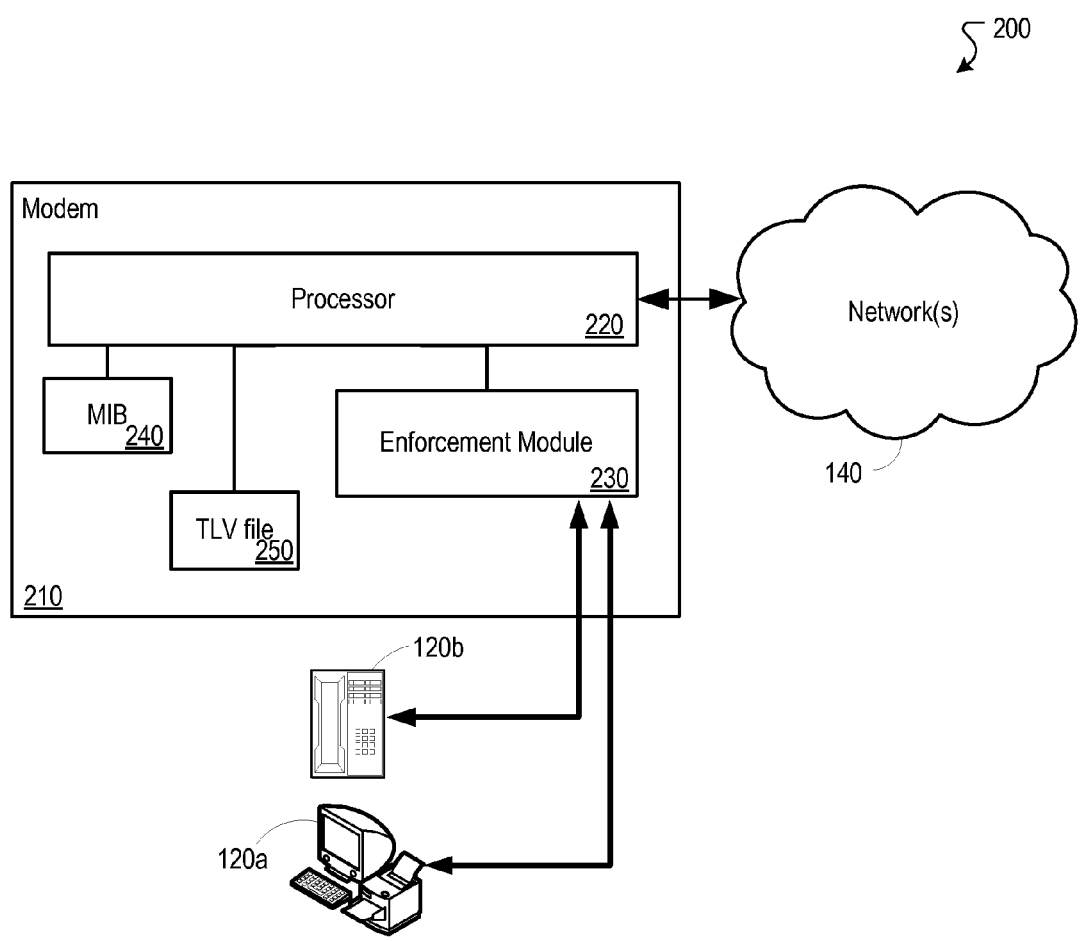
FIG. 2 is a block diagram illustrating an example modem device operable to specify and enforce IPv4 and IPv6 CPE limits.

FIG. 2 is a block diagram illustrating an example modem device operable to specify and enforce IPv4 and IPv6 CPE limits. The modem device 210 (e.g., modem device 110 of FIG. 1) can connect to a CPE device 120a, VoIP phone 120b, and Network(s) 140 via a network interface. The modem device 210 can include a processor 220, enforcement module 230, MIB 240, and TLV file 250.

The modem device 210 can operate to specify and enforce IPv4 and IPv6 CPE limits. In some implementations, the modem device 210 can operate to receive data packets from the CPE device 120a and/or IP phone 120b and subsequently transmit the data to the network 140. The processor 220 can operate to retrieve IPv4 and IPv6 CPE limits from the MIB 240 or TLV file 250. The processor 220 can also operate to enforce IPv4 and IPv6 CPE limits via the enforcement module 230.

When a packet destined for the network 140 is received by the modem device 210, the etherType field of the packet's Ethernet header is examined. If the etherType is IPv4 (e.g., 0x0800 or 0x0806), the IPv4 CPE table is to be searched and the IPv4 CPE limit is to be enforced; if the etherType is IPv6 (e.g., 0x86DD), the IPv6 CPE table is to be searched and the IPv6 CPE limit is to be enforced. If the source MAC address of the packet is found in the appropriate CPE table, the packet is forwarded to the network 140. If the source MAC address of the packet is not found in the appropriate CPE table, and the appropriate CPE limit is not reached, the source MAC address of the packet is added to the appropriate CPE table and the packet is forwarded to the network 140. If the source MAC address of the packet is not found in the appropriate CPE table, and the appropriate CPE limit is reached, the packet is discarded by the modem device 210. Optional error logging functions can subsequently be performed. In some implementations, one or more counters can be maintained and updated to determine the number of IPv4 and IPv6 devices connected to the modem. It should be understood that counters and/or source MAC addresses can be stored in one or more of the following methods: management information base (MIB) 240, TLV file 250, registers, and/or any other volatile or non-volatile memory.

Figure 3:
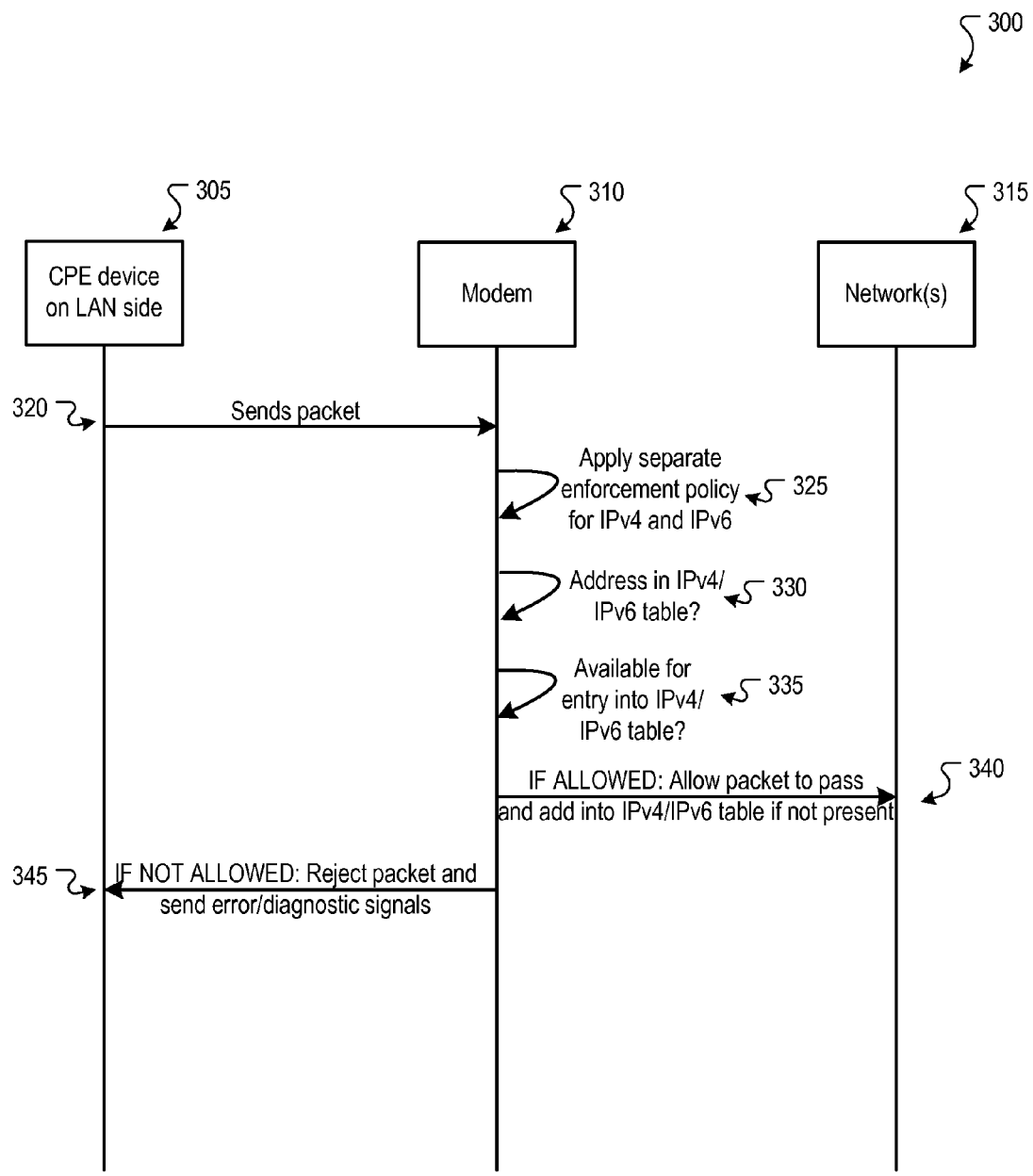
FIG. 3 is a sequence diagram illustrating an example method operable to specify and enforce IPv4 and IPv6 CPE limits.

FIG. 3 is a sequence diagram illustrating an example method operable to specify and enforce IPv4 and IPv6 CPE limits. The sequence diagram 300 can involve a CPE device 305 (e.g., CPE device 120a-b of FIG. 1) interacting with a modem 310 (e.g., modem 110 of FIG. 1 and 210 of FIG. 2) and network(s) 315 (e.g., network(s) 140 of FIG. 1). The initialization flow for specifying and enforcing IPv4 and IPv6 CPE limits can begin when a CPE device 305 sends a packet to a modem 310 (320). The CPE device 305 can send a packet with either an IPv4 or IPv6 designation.

When the packet is received by the modem device 310, the modem applies a separate enforcement policy for IPv4 and IPv6 packets (325). The application of the enforcement policy can occur prior to, in conjunction with, or after subsequent steps in this sequence. In some implementations, the source MAC address of the packet can be looked up in the IPv4 and/or IPv6 address table (330). In some implementations, the tables can be checked for availability by keeping count of minimum and/or maximum entries (335). It should be understood that the storing and look-up of counts can occur in one or more memory storing elements.

In some implementations, if the packet is allowed to pass through because of an IP version status and/or is available for addition into the IP version tables, then the packet is properly recorded and the packet is allowed to pass to the network 315 (340). In other implementations, the IPv4 and/or IPv6 count is not modified or checked. In some implementations, the table and/or count is stored in the MIB. In other implementations, the table and/or count is stored in a TLV file. In still other implementations, the table and/or count is stored in a register or other memory element.

In some implementations, if the packet is not allowed to pass through because of an IP version status and/or reaching a maximum count, then the packet is rejected and the modem records an error or diagnostic signal (345). In other implementations, no error or diagnostic signals are provided when packets are rejected.

Figure 4:
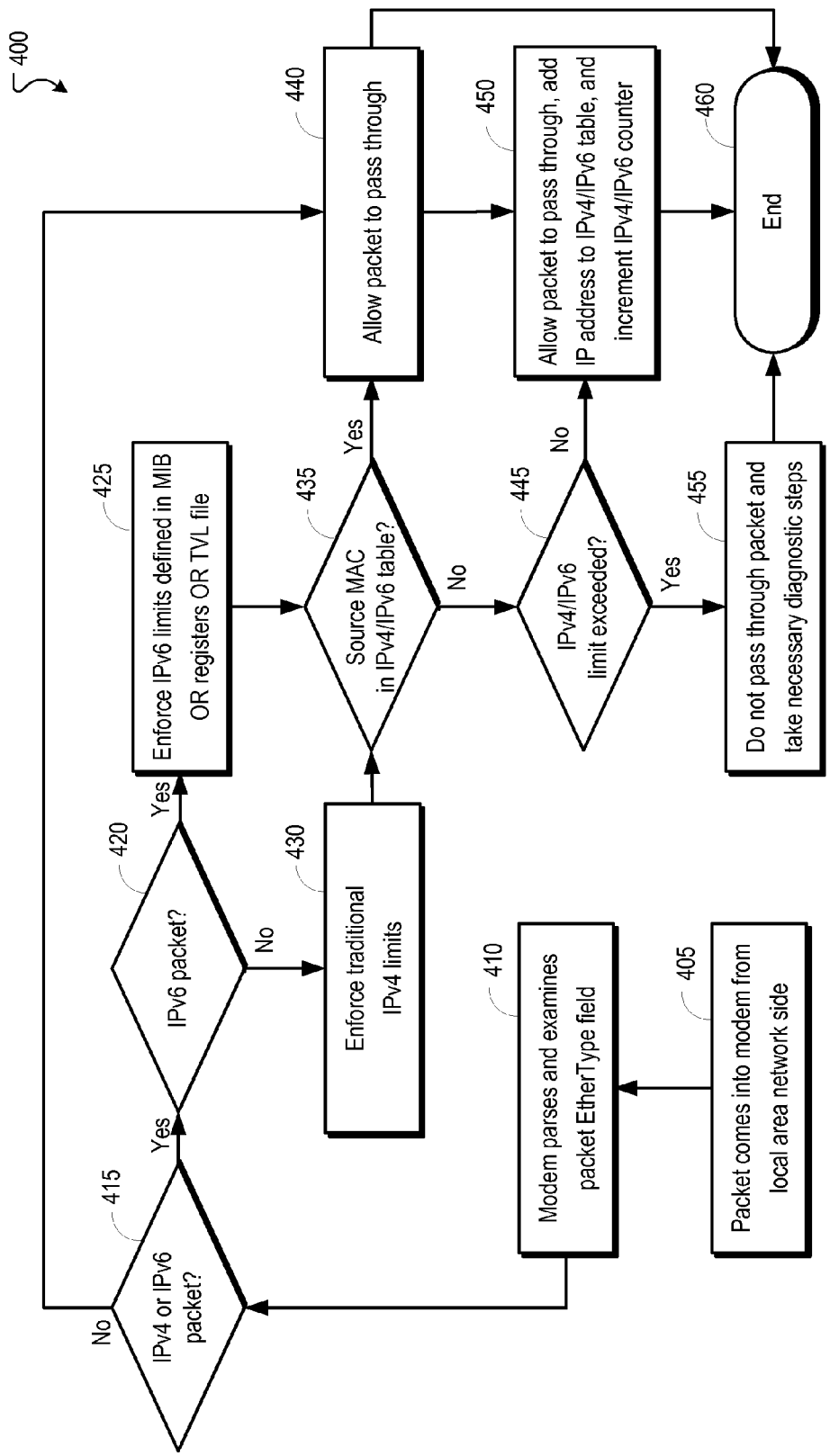
FIG. 4 is a flowchart illustrating another example process operable to specify and enforce IPv4 and IPv6 CPE limits.

FIG. 4 is a flowchart illustrating another example process operable to specify and enforce IPv4 and IPv6 CPE limits. The process 400 begins at stage 405 when the modem device receives IP packets from the local area network (LAN) side.

At stage 410, the modem parses and examines the etherType field of the packet's Ethernet header. The modem device (e.g., modem device 110 of FIG. 1 and modem device 210 of FIG. 2) can examine the packet's header using the processor (e.g., processor 220 of FIG. 2) and/or enforcement module (e.g., enforcement module 230 of FIG. 2). In other implementations, the parsing and/or examination can occur outside of the modem device.

At stage 415, a determination is made whether the received packet is an IPv4 or IPv6 packet. The determination can be made, for example, by the modem device (e.g., modem device 110 of FIG. 1 and modem device 210 of FIG. 2). In other implementations, the determination can be made outside of the modem device and transmitted to the modem device.

If the received packet is determined to be neither an IPv4 nor an IPv6 packet at stage 415, then at stage 440 the modem passes the packet through and processes the packet. In some implementations, the packet can be processed according to DOCSIS standards if it is neither an IPv4 nor an IPv6 packet. In other implementations, the packet can be discarded. The process 400 ends at stage 460.

If the received packet is determined to be either an IPv4 or IPv6 packet at stage 415, then at stage 420 a determination is made whether the received packet is an IPv6 packet. The determination can be made, for example, by the modem device (e.g., modem device 110 of FIG. 1 and modem device 210 of FIG. 2). In other implementations, the determination can be made outside of the modem device and transmitted to the modem device.

If the received packet is determined to be an IPv6 packet at stage 420, then at stage 425 the modem enforces IPv6 CPE limits. The enforcement can be performed by the modem device (e.g., modem device 110 of FIG. 1 and modem device 210 of FIG. 2) and can occur with the MIB, TLV file, and/or other memory storage element. In other implementations, no explicit step is taken and the modem flags the packet as an IPv6 packet.

If the received packet is determined not to be an IPv6 packet at stage 420, then at stage 430 the modem enforces IPv4 CPE limits. The enforcement of IPv4 CPE limits can be performed by the modem device (e.g., modem device 110 of FIG. 1 and modem device 210 of FIG. 2). In other implementations, the IPv4 CPE enforcement can involve little or no further enforcement mechanisms and the modem flags the packet as an IPv4 packet.

At stage 435, a determination is made whether the source MAC address is in the IPv4/IPv6 CPE table. The determination can be made, for example, by the modem device (e.g., modem device 110 of FIG. 1 and modem device 210 of FIG. 2). The determination of the IPv4/IPv6 CPE table can be compared in the MIB, TLV file, or other memory element. In alternative implementations, the IPv4/IPv6 CPE enforcement can involve little or no further enforcement mechanisms.

If the source MAC address is in the IPv4/IPv6 CPE table at stage 435, then at stage 440 the packet is passed through to the network. The pass through from the modem device (e.g., modem device 110 of FIG. 1 and modem device 210 of FIG. 2) can transmit to the network (e.g., network(s) 140 of FIG. 1). The process 400 ends at stage 460.

If the source MAC address is not in the IPv4/IPv6 CPE table at stage 435, then at stage 445, a determination is made whether the limit count of CPE devices has been exceeded for IPv4/IPv6 CPE devices. The determination can be made by the modem device (e.g., modem device 110 of FIG. 1 and modem device 210 of FIG. 2).

If the limit count for IPv4/IPv6 CPE devices is not exceeded at stage 445, then at stage 450 the packet is allowed to pass through and added to the IPv4/IPv6 CPE table. The pass through and addition to the IPv4/IPv6 CPE table can be performed by the modem device (e.g., modem device 110 of FIG. 1 and modem device 210 of FIG. 2). The addition to the IPv4/IPv6 CPE table can be accomplished in the MIB, TLV file, or other memory element. The process ends at state 460.

If the limit count for IPv4/IPv6 CPE devices is exceeded at stage 445, then at stage 455 the packet is rejected and the modem can take diagnostic steps. The rejection and diagnostic steps can be performed by the modem device (e.g., modem device 110 of FIG. 1 and modem device 210 of FIG. 2). In some implementations, no diagnostic steps are performed. The process ends at state 460.

Figure 5:
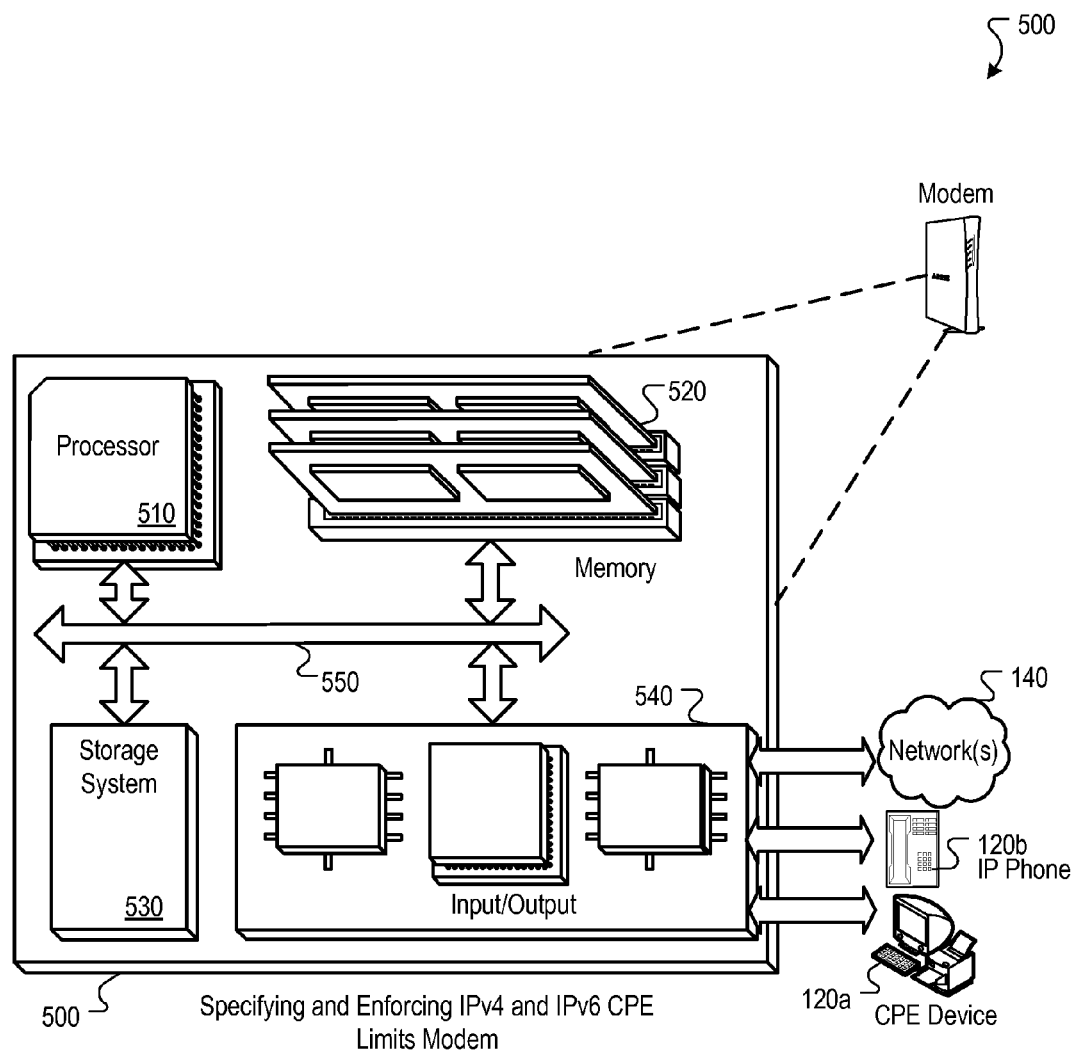
FIG. 5 is a block diagram of an example modem device operable to specify and enforce IPv4 and IPv6 CPE limits.

FIG. 5 is a block diagram of an example modem device operable to specify and enforce IPv4 and IPv6 CPE limits. The modem device 400 with IPv4 and IPv6 CPE limit enforcement can include a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the device 500. In one implementation, the memory 520 is a computer-readable medium. In one implementation, the memory 520 is a volatile memory unit. In another implementation, the memory 520 is a non-volatile memory unit.

In some implementations, the storage device 530 is capable of providing mass storage for the device 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the device 500. In one implementation, the input/output device 540 can include one or more of a wireless interface, IP phone 120b (e.g., IP phone 120b of FIG. 1), CPE device 120a (e.g., CPE device 120a of FIG. 1), such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a IP phone 560 and/or CPE device 570), as well as sending communications to, and receiving communications from various networks.

The device (e.g., a modem device device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. An IPv4/IPv6 CPE limit enforcement modem device, comprising:
   a network interface operable to receive an incoming signal from a CPE device, wherein the incoming signal comprises a data packet;
   a processor module operable to:
      inspect the data packet to determine an internet protocol version, wherein the determined internet protocol version is one of either a first internet protocol version or a second internet protocol version; and
      provide an enforcement policy based on the internet protocol version; and
   wherein the enforcement policy limits the number of CPE devices based upon the determined internet protocol version by preventing the output of the data packet from the modem device when a predetermined threshold associated with the allowed number of CPE devices of the same internet protocol version as the determined internet protocol version has been exceeded, the predetermined threshold being one of a threshold associated with the first internet protocol version or a threshold associated with the second internet protocol version, wherein the threshold associated with the first internet protocol version is different than the threshold associated with the second internet protocol version.

2. The IPv4/IPv6 CPE limit enforcement modem device of claim 1, wherein determining the internet protocol version is performed by receiving a packet and examining the etherType field of the Ethernet header.

3. The IPv4/IPv6 CPE limit enforcement modem device of claim 2, wherein the IPv4/IPv6 CPE limit enforcement modem device operates in a DOCSIS network.

4. The IPv4/IPv6 CPE limit enforcement modem device of claim 1, wherein determining the internet protocol version is performed by inspecting the data packet's Ethernet header's etherType field.

5. The IPv4/IPv6 CPE limit enforcement modem device of claim 4, wherein the enforcement policy involves comparing the data packet source MAC address with a corresponding CPE table.

6. The IPv4/IPv6 CPE limit enforcement modem device of claim 5, wherein configurable IPv4 and IPv6 CPE limits reside in a management information base.

7. The IPv4/IPv6 CPE limit enforcement modem device of claim 6, wherein the IPv4/IPv6 CPE limit enforcement modem device operates in a DOCSIS network.

8. The IPv4/IPv6 CPE limit enforcement modem device of claim 5, wherein configurable IPv4 and IPv6 CPE limits reside in a TLV-based configuration file.

9. The IPv4/IPv6 CPE limit enforcement modem device of claim 8, wherein the IPv4/IPv6 CPE limit enforcement modem device operates in a DOCSIS network.

10. A computer implemented method comprising:
receiving a data packet from a CPE device via an interface at a modem device;
determining the data packet internet protocol version via a processor, wherein the data packet internet protocol version is one of either a first internet protocol version or a second internet protocol version;
comparing the data packet source MAC address with a data table via a processor, and determining whether the data packet source MAC address is found within the data table;
applying an enforcement policy based on the data packet internet protocol version via a processor, wherein the enforcement policy comprises:
determining whether a predetermined threshold associated with the determined data packet internet protocol version has been exceeded by the number of CPE devices associated with the modem device, the CPE devices being of the same internet protocol version as the internet protocol version of the CPE device from which the data packet was received, wherein the predetermined threshold associated with the first internet protocol version is different than the predetermined threshold associated with the second internet protocol version; and
outputting the data packet from the modem device if the data packet source MAC address is found within the data table, or if the predetermined threshold associated with the determined data packet internet protocol version has not been exceeded by the number of CPE devices associated with the modem device.

11. The computer implemented method of claim 10, wherein determining the data packet internet protocol version is performed by examining the etherType field of the data packet's Ethernet header via a processor.

12. The computer implemented method of claim 11, wherein the method is performed on data packets operating in a DOCSIS network.

13. The computer implemented method of claim 10, wherein determining the data packet internet protocol version is performed by inspecting the data packet's Ethernet header's etherType field via a processor.

14. The computer implemented method of claim 13, wherein applying an enforcement policy is performed by inspecting the data packet's Ethernet header's etherType field via a processor and involves comparing the data packet's source MAC address with a corresponding CPE table of the same internet protocol version type via a processor.

15. The computer implemented method of claim 14, wherein configurable IPv4 and IPv6 CPE limits resides in a management information base.

16. The computer implemented method of claim 14, wherein configurable IPv4 and IPv6 CPE limits reside in a TLV-based configuration file.

17. The computer implemented method of claim 10 further comprising:
wherein the data packet internet protocol versions include IPv4 and IPv6 specifications, maintaining an IPv4 CPE counter and an IPv6 CPE counter to apply the enforcement policy.

18. A computer implemented method comprising:
receiving a data packet at a modem device via an interface;
determining the data packet internet protocol version via a processor;
for each of a plurality of internet protocol versions, maintaining a list of MAC addresses associated with CPE devices that have communicated through the modem device using the internet protocol version;
comparing the data packet source MAC address with the MAC addresses included within the list associated with the determined data packet internet protocol version; and
applying an enforcement policy based on the comparison between the data packet source MAC address and the MAC addresses included within the list associated with the determined data packet internet protocol version, and wherein the enforcement policy is further based upon the number of MAC addresses included within the list associated with the determined data packet internet protocol version.

19. The computer implemented method of claim 18, wherein applying the enforcement policy comprises:
if the data packet source MAC address is not found within the list of MAC addresses associated with the determined data packet internet protocol version, and the number of MAC addresses within the list is less than a predetermined threshold, adding the data packet source MAC address to the list and outputting the received data packet to an upstream destination.

20. The computer implemented method of claim 18, wherein applying the enforcement policy comprises:
if the data packet source MAC address is not found within the list of MAC addresses associated with the determined data packet internet protocol version, and the number of MAC addresses within the list is greater than a predetermined threshold, rejecting the request to output the received packet and outputting an error message to the device from which the packet was received.

* * * * *